(12) United States Patent
Park et al.

(10) Patent No.: US 11,924,866 B2
(45) Date of Patent: Mar. 5, 2024

(54) EHT STATION CONFIGURED TO ENCODE U-SIG FOR TRANSMISSION OF EHT PPDU OF 40, 80, 160 AND 320 MHZ BANDWIDTHS

(71) Applicant: Intel Corporation, Santa Clara, CA (US)

(72) Inventors: Minyoung Park, San Ramon, CA (US); Thomas J. Kenney, Portland, OR (US); Laurent Cariou, Milizac (FR); Po-Kai Huang, San Jose, CA (US); Qinghua Li, San Ramon, CA (US); Xiaogang Chen, Portland, OR (US); Feng Jiang, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/116,080

(22) Filed: Mar. 1, 2023

(65) Prior Publication Data
US 2023/0292350 A1 Sep. 14, 2023

Related U.S. Application Data

(63) Continuation of application No. 16/998,681, filed on Aug. 20, 2020, now Pat. No. 11,678,355.
(Continued)

(51) Int. Cl.
*H04W 72/12* (2023.01)
*H04W 72/04* (2023.01)
(Continued)

(52) U.S. Cl.
CPC ......... *H04W 72/535* (2023.01); *H04W 72/20* (2023.01); *H04W 84/12* (2013.01)

(58) Field of Classification Search
CPC ........................... H04W 72/535; H04W 72/20
(Continued)

(56) References Cited

U.S. PATENT DOCUMENTS

| 2015/0085775 A1 * | 3/2015 | Choi | H04W 74/0808 370/329 |
|---|---|---|---|
| 2018/0176865 A1 * | 6/2018 | Kim | H04W 74/06 |

(Continued)

FOREIGN PATENT DOCUMENTS

| WO | WO-2021029669 A1 * | 2/2021 | ............ H04L 1/0003 |

OTHER PUBLICATIONS

"U.S. Appl. No. 17/401,691, Non Final Office Action dated Oct. 14, 2022", 8 pgs.

*Primary Examiner* — Faisal Choudhury
(74) *Attorney, Agent, or Firm* — Schwegman Lundberg & Woessner, P.A.

(57) ABSTRACT

Embodiments of an Extremely High Throughput Station (EHT STA) (STA1) configured for operating in a next-generation (NG) wireless local area network (WLAN) are described herein. In some embodiments, the EHT STA encodes a common signal field (SIG) (Coex-SIG) of an EHT PPDU to include a TXOP duration field. The TXOP duration field is more than seven bits to indicate an actual TXOP duration of a transmission from the EHT STA comprising the EHT PPDU transmitted to a second station (STA2). Decoding the TXOP duration field of the EHT PPDU by a third-party station (STA4) causes the third-party station (STA4) to defer a transmission until after an end of the transmission from the second station (STA2).

20 Claims, 6 Drawing Sheets

Related U.S. Application Data

(60) Provisional application No. 62/889,761, filed on Aug. 21, 2019, provisional application No. 62/983,198, filed on Feb. 28, 2020, provisional application No. 63/003,376, filed on Apr. 1, 2020.

(51) Int. Cl.
    *H04W 72/20*     (2023.01)
    *H04W 72/50*     (2023.01)
    *H04W 84/12*     (2009.01)

(58) Field of Classification Search
    USPC .......................................................... 370/329
    See application file for complete search history.

(56) References Cited

U.S. PATENT DOCUMENTS

| | | | |
|---|---|---|---|
| 2020/0382998 A1* | 12/2020 | Cao | H04L 1/0041 |
| 2021/0045151 A1* | 2/2021 | Chen | H04W 74/002 |
| 2021/0315036 A1* | 10/2021 | Jang | H04W 76/15 |
| 2021/0377971 A1 | 12/2021 | Park et al. | |

\* cited by examiner

WLAN NETWORK CONFIGURATION

EHT STATION CONFIGURED TO ENCODE U-SIG FOR TRANSMISSION OF EHT PPDU OF 40, 80, 160 AND 320 MHZ BANDWIDTHS

PRIORITY CLAIMS

This application is a continuation of U.S. patent application Ser. No. 16/998,681, filed Aug. 20, 2020, which claims priority under 35 U.S.C. 119(e) to U.S. Provisional Patent Application Ser. No. 62/889,761 filed Aug. 21, 2019 [reference number AC4202-Z], U.S. Provisional Patent Application Ser. No. 63/003,376 filed Apr. 1, 2020 [reference number AC8886-Z], and U.S. Provisional Patent Application Ser. No. 62/983,198 filed Feb. 28, 2020 [reference number AC8216-Z], each of which is incorporated herein by reference in its entirety.

TECHNICAL FIELD

Embodiments pertain next-generation (NG) wireless local area networks (WLANs) (i.e., Extremely High Throughput (EHT). Some embodiments relate to signalling a duration of a transmission opportunity (TXOP) in a TXOP field in NG WLANs.

BACKGROUND

Current WLANs that operate in accordance with the IEEE 802.11ax standard include a TXOP field in the SIG-A field to provide the TXOP information to third-party stations that cannot decode the MAC header correctly. However, use of that TXOP field may not represent the actual TXOP duration indicated in the Duration field of the MAC header for EHT operation.

Thus, what is needed is a technique to represent the actual TXOP duration to allow for third-party stations to accurately determine the TXOP duration and defer their transmissions accordingly.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As mentioned above, in 802.11ax, the 7-bit long TXOP field is included in the SIG-A field to provide the TXOP information to $3^{rd}$ party stations that cannot decode the MAC header correctly. However, the current TXOP field defined in 802.11be doesn't fully represent the actual TXOP_DURATION indicated in the Duration field of the MAC header. The Duration field in the MAC header is represented as a value that has 1 usec time unit, whereas the TXOP field in the SIG-A field has 8 or 128 usec resolution depending on the duration of the actual TXOP time. That is, when the actual TXOP duration is less than 512 usec, the TXOP field is encoded in 8 usec unit and when the actual TXOP duration is larger than or equal to 512 usec, the TXOP field is encoded in 128 usec unit. The Duration field can represent 0-32.767 msec, whereas the maximum value of TXOP is limited to 8.576 msec.

Embodiments of an Extremely High Throughput Station (EHT STA) (STA1) configured for operating in a next-generation (NG) wireless local area network (WLAN) are described herein. In some embodiments, the EHT STA encodes a common signal field (SIG) (Coex-SIG) of an EHT PPDU to include a TXOP duration field. The TXOP duration field is more than seven bits to indicate an actual TXOP duration of a transmission from the EHT STA comprising the EHT PPDU transmitted to a second station (STA2). Decoding the TXOP duration field of the EHT PPDU by a third-party station (STA4) causes the third-party station (STA4) to defer a transmission until after an end of the transmission from the second station (STA2).

Figure 1:
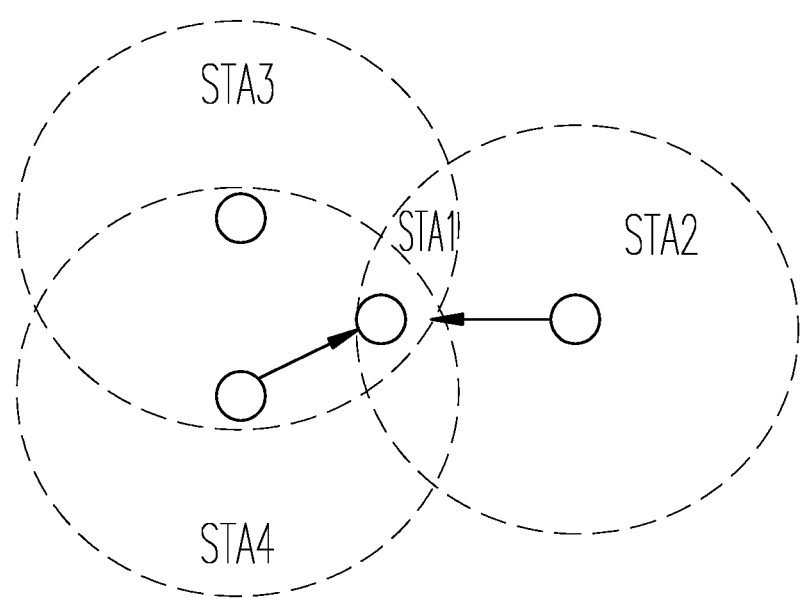
FIG. 1 illustrates a WLAN network configuration in accordance with some embodiments.

FIG. 1 illustrates a WLAN network configuration in accordance with some embodiments. FIG. 1 illustrates STA1 and STA2 which may communicate with each other. FIG. 1 also illustrates STA2 and STA4, which may be within communication range of STA1, but outside of communication range of STA2.

Figure 2:
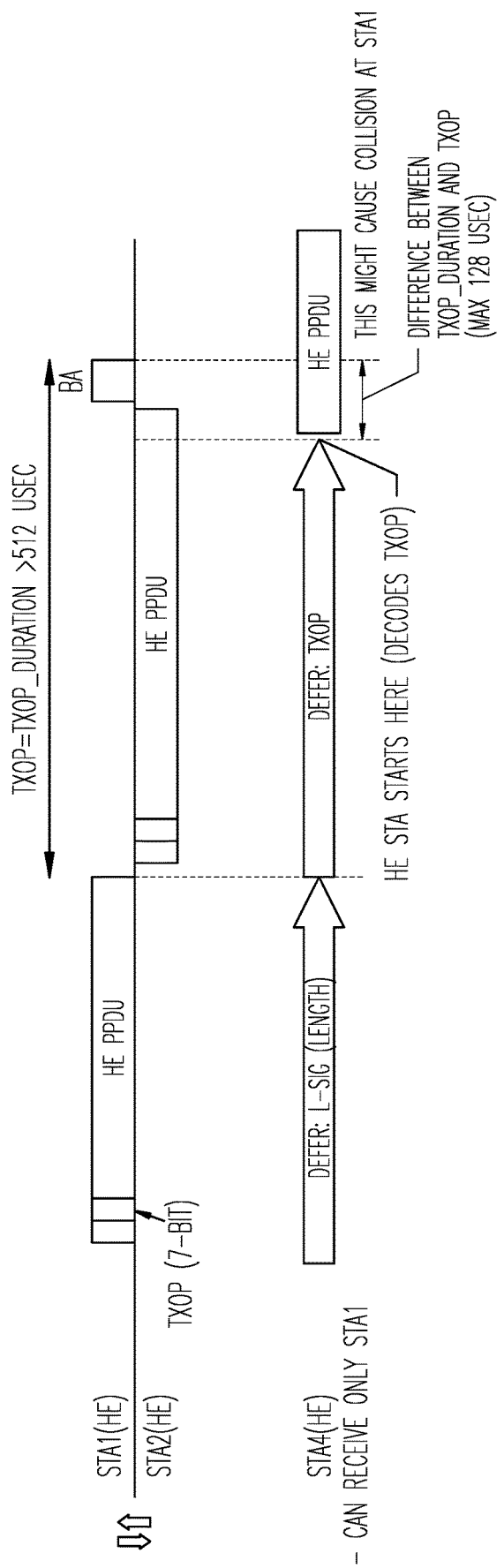
FIG. 2 illustrates a time diagram illustrating when a TXOP field does not represent the actual TXOP duration.

FIG. 2 illustrates a time diagram illustrating when a TXOP field does not represent the actual TXOP duration. The example illustrated in FIG. 2 shows the problem when the actual TXOP duration is larger than 512 usec and the difference between the actual TXOP duration and the value of the TXOP field is large (e.g. close to 128 usec). In the example, STA1 and STA2 exchange data and STA4 is $3^{rd}$ party STA. Since the TXOP_DURATION is larger than 512 usec, the encoding of the TXOP field in the SIG-A field is done in 128 usec time unit and the value of the TXOP field points to the time much earlier than the actual end of the TXOP. When STA4 is out of the transmission range of the STA2, STA4 defers based on the TXOP field of the first PPDU transmitted by STA1 (when the MCS used in the payload is too high and the MAC header is not decoded correctly) and may start the transmission before the end of the actual TXOP and cause collision at STA1.

Embodiments disclosed here address this issue by increasing the number of bits of the TXOP field in 802.11be to represent the actual TXOP duration of packet exchanges between two STAs and propose encoding methods. These embodiments are described in more detail below.

Figure 3:
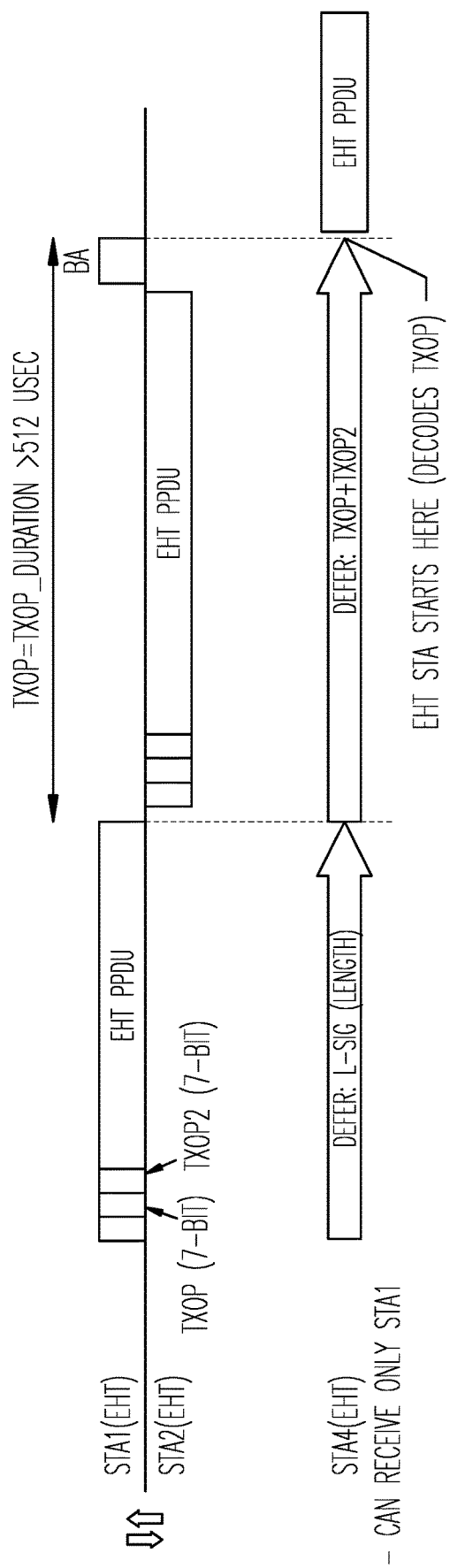
FIG. 3 illustrates a time diagram illustrating when a TXOP field represents the actual TXOP duration in accordance with some embodiments.

FIG. 3 illustrates a time diagram illustrating when a TXOP field represents the actual TXOP duration in accordance with some embodiments. In 802.11be, we propose to increase the resolution of the TXOP field. Instead of 7-bit TXOP field, we propose to extend this field to have 1 usec resolution as follows:

Option 1: Using existing encoding method of 802.11ax for the TXOP field and adding additional 7 bits as a new TXOP2 field to represent the remaining 128 usec as follows.

Both the TXOP field and the TXOP2 field are included in the Common SIG (or Coex-SIG) field:

(a) When B0 of the TXOP Field is Set to 1:
  The TXOP field (B1-B6: 6-bit)=floor ((TXOP_DURATION−512)/128)
  The TXOP2 field (7-bit)=TXOP_DURATION−floor ((TXOP_DURATION−512)/128)*128
  Alternatively, the TXOP2 field may be 8 usec resolution to reduce the number of bits as follows: TXOP (7-bit)+TXOP2 (4-bit)=11 bits (b) When B0 of the TXOP Field is Set to 0:
  The TXOP field(B1-B6: 6-bit)=floor ((TXOP_DURATION)/8)
  The TXOP2 field(7-bit)=TXOP_DURATION−floor ((TXOP_DURATION)/8)*8
  Alternatively, when B0=0, just 3 bits of the TXOP2 field may be used and the rest of 4 bits may be used for other purpose (or reserved).

In these embodiments, the TXOP_DURATION is the actual TXOP duration.

An example is illustrated as follows. STA4 now defers until the end of the actual TXOP duration by decoding both the TXOP field and the TXOP2 field.

Option 2: Defining a new TXOP field that is 14-15 bit long. In these embodiments, instead of using the encoding method of the TXOP field in the SIG-A defined in 802.11ax, define a new TXOP field which is 14-15 bits long and use the same encoding method as the Duration field of the MAC header.

Some embodiments are directed to resource unit signalling in an EHT signal (SIG) field. These embodiments are described in more detail below.

There was a strong momentum in IEEE to reuse the 11ax HE-SIGB structure for resource unit (RU) signaling. This disclosure proposes several ways to improve the efficiency along this direction. The protocol has not been discussed in extreme high throughput (EHT). No previous solutions are known yet.

Example embodiments of the present disclosure relate to systems, methods, and devices for details of resource unit (RU) signaling in EHT-SIG field.

In one embodiment, a RU signaling system may facilitate reducing the overhead of RU signaling in the EHT-SIG. The proposals include:
1. Limit the number of users scheduled in one PPDU. Especially for the MUMIMO modes.
2. Compression modes definition and indication.
3. Extend the 11ax RU allocation subfield to support new RUs in 11be.
4. Propose rules to support the per 80 MHz different EHT-SIG.
5. Split the common field of EHT-SIG into several CWs.

In one or more embodiments, a RU signaling system may limit the number of users scheduled in one PPDU. Especially for the MUMIMO modes.

The reasons to limit the number of users in one PPDU include:
1) MUMIMO support 16 users even in 20 MHz for 11ax. This is not useful in the field.
2) MUMIMO with OFDMA is not tested at tall in WFA.
3) Limit the number of users will reduce the signaling overhead.

The proposal is to limit the number of users in DL MUMIMO to be a reasonable number. For example, if a PPDU only includes non-OFDMA MUMIMO, the number of users could be limited to 16.

For another example, if a PPDU include OFDMA+MUMIMO, the total number of users participated in MUMIMO is limited to 16. Namely, if there are two RUs and each of which is scheduled as MUMIMO transmission, then AP can schedule 8 user MUMIMO in RU 1 and 8 user MUMIMO in RU 2, or 4 users MUMIMO in RU1 and 12 user MUMIMO in RU2, etc.

For the third example, it may be proposed to disallow MUMIMO with RU size <242 tone to simplify verification.

Another limitation could be to limit the number of RUs capable of doing MUMIMO scheduling in a PPDU. For instance, a 320 MHz PPDU may be split into 4 RUs and each of which can schedule MUMIMO transmission. However, 4 MUMIMO RU will not improve performance in the field but only increase the validation complexity. It may be proposed to limit the number of RUs that can do MUMIMO for different PPDU BW. Table 1 gives an example.

TABLE 1

Number of MUMIMO capable RUs in one PPDU one

| PPDU BW (MHz) | Number of RUs for MUMIMO |
| --- | --- |
| 20 | 1 |
| 40 | 2 |
| 80 | 2 |
| 160 | 4 |
| 320 | 4 |

Compression modes definition and indication.

In some embodiments, 802.11be compression modes may include:
  Mode 1: Non-OFDMA compression without puncturing. The same as 11ax.
  Mode 2: Non-OFDMA compression with puncturing.
  Mode 3: OFDMA large RU only mode.

The indication can be done in U-SIG or the common field of EHT-SIG if common field is present.

To indicate which subchannel is punctured, bit map can be included in the common field of the EHT-SIG. Each bit indicates a 20 MHz subchannel is punctured or not.

For mode 3, there could be several sub-modes defined. For example, a PPDU is equally assigned to 4 STA or 8 STAs. This way the RU allocation subfield is not required in the EHT-SIG. However, in order to indicate the MUMIMO mode in one or two RUs. Two options can be used:
  Opt. 1) In the user field, add a new subfield to indicate the total number of users for MUMIMO.
  Opt. 2) In the common field or U-SIG, indicate the total number of users in the RU that was scheduled with MUMIMO. If more than one RU was scheduled with MUMIMO, the number of user in each RU need to be indicated.

In one or more embodiments, a RU signaling system may extend the 11ax RU allocation subfield to support new RUs in 11be.

The RU allocation subfield indicate a RU allocation table which is an extension of 11ax. The rules to define the extended table include:
  Define a non-contiguous RU as a physical RU. Namely, one or multiple entries shall be defined for each non-contiguous RU.
  If a RU is allowed for both OFDMA and non-OFDMA, only need to define entries for the OFDMA case. The non-OFDMA can reuse the entries defined for OFDMA. It reduces the number of entries. Another way is if a RU is allowed for both OFDMA and non-OFDMA, a dedicated entry for the non-OFDMA case is defined.

In one or more embodiments, a RU signaling system may propose rules to support the per 80 MHz different EHT-SIG.

802.11be enable the per 80 MHz variated EHT-SIG design. That means 80 MHz operating STA may camp on the non-primary 80 MHz. For a 320 Mhz PPDU: STA 1/2/3/4 are 320 MHz capable PPDU. STA 5/6 are the 80 MHz operating STA which camps on the $2^{nd}$ and $3^{rd}$ 80 Mhz respectively. STA3 and STA 5 are multiplexed with MUMIMO.

With this configuration, STA1/2/3/4 will attain their RA information from the P80. STA5 and STA 6 will attain their RA information from the $2^{nd}$ and $3^{rd}$ 80 Mhz respectively.

STA1/2/3/4 can attain their RA information correctly without any special rules. However, STA5 and STAG need the following rules:

1) If the Nss allocated to STA 5 is greater than or equal to the Nss allocated to STA 3, STA 5 simply parses the common and user fields in the 2nd 80 MHz and attain the RA information.
2) If the Nss allocated to STA 5 is smaller than Nss allocated to STA 3, AP has two options:
Opt. a): add a dummy user field before the user field of STA5. Such that STA 5 can correctly parse the spatial configuration in the user field.
Opt. b): don't add dummy user field but indicate STA 5 that there is only one user field in the EHT-SIG. Note that this option is problematic if more than one 80 Mhz operating STAs camps on the 2nd 80 MHz.

The rule is: if an 80 Mhz operating STA camps on non-primary 80 MHz and pairs with 320 MHz or 160 MHz operating STA with MUMIMO, one or more dummy user field shall be added before the 80 Mhz operating STA to guarantee the 80 MHz operating STA follows the correct order and attain its own RA information.

3) In order to let STA 6 be able to parse the RA information correctly, AP has to indicate the 484 RU assigned to STA4 as punctured. Such that STA 6 understands only one user field in the EHT-SIG of the 80 MHz it camps on. Otherwise, AP has to add a dummy user field to make sure STA 6 attain the 2nd user field in the EHT-SIG of the 80 MHz STA 6 camps on.

The rule is: if an 80 Mhz operating STA camps on non-primary 80 MHz and pairs with 320 MHz or 160 MHz operating STA with OFDMA, one or more dummy user field shall be added before the 80 Mhz operating STA to guarantee the 80 MHz operating STA follows the correct order and attain its own RA information.

Figure 5:
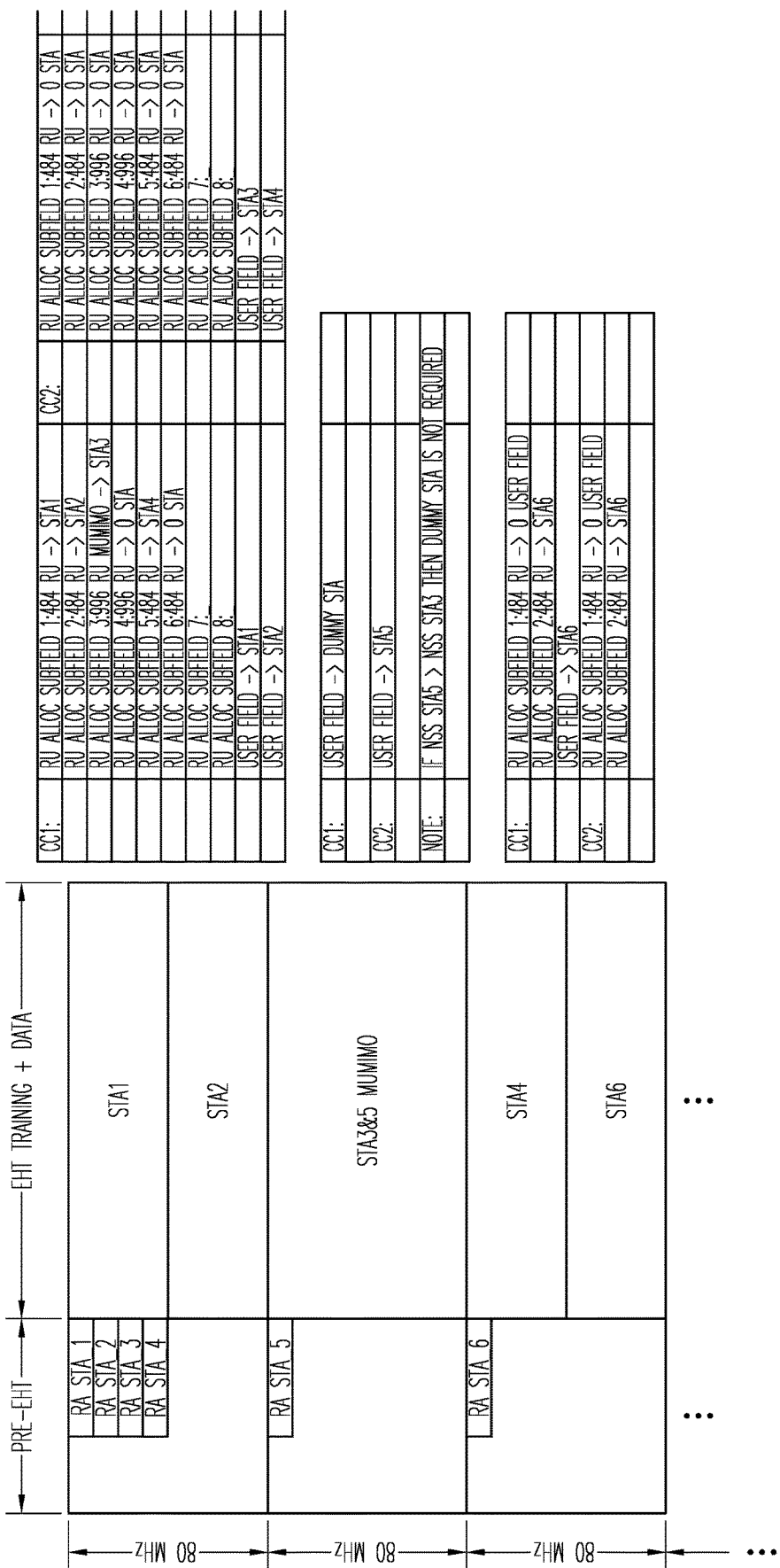
FIG. 5 is an example of the per 80 MHz variable EHT-SIG design in accordance with some embodiments.

FIG. 5 is an example of the per 80 MHz variable EHT-SIG design in accordance with some embodiments. In one or more embodiments, a RU signaling system may split the common field of EHT-SIG into several CWs.

In 320 MHz PPDU, the common field of EHT-SIG may include up to 64 bits just for RU allocation subfield in each content channel. It may be proposed to split these bits into two CWs and each one has its own tail bits and CRC. Note that this rule may be applied to 160 MHz or 240 MHz PPDU.

With this proposal, each codeword will have 32 bits or 16 bits, such that the performance is better than the user info field.

Some embodiments are directed to EHT resource unit allocation signalling. These embodiments are described in more detail below.

The channel width in EHT is reaching 320 MHz. The channel width can be even larger as Wi-Fi evolving. However, wider channel width does not mean the client will support such large channel due to power consumption and use scenarios. Very likely, a client only camps on part of the channel, e.g. 80 MHz/160 MHz, and AP will schedule multiple clients to do OFDMA across the whole channel width.

However, the RU allocation signaling design in 11ax expects one client to understand the whole picture of the RU allocation across the whole bandwidth. Namely, a client not only understand its own RU allocation, it can also attain the RU allocation of other clients. This design doesn't fit well with the case of larger bandwidth.

This disclosure proposes several solutions for the RU allocation in larger bandwidth.

Example embodiments of the present disclosure relate to systems, methods, and devices for on the design of EHT RU allocation signaling.

In one embodiment, an EHT RU allocation signaling system may define options for self-contained RU allocation signaling.

In one embodiment, an EHT RU allocation signaling system define options for multiple compression modes and reuse 11ax RU allocation signaling.

Self-contained RU allocation signaling:

The reason of naming as self-contained is by comparing with 11ax RU signaling which includes the common field and user field. Combining both fields plus the order of the user fields, a client will be able to attain the full RU allocation information.

A self-contained RU signaling is much simpler than the 11ax ones. A client will only need to find its user field and decode the RU allocation signaling. The client does not need to parse the information related to other clients.

In an example, the 80 MHz RU, there are 37 RUs that has 26 tones; 16 RUs that has 52 tones; 8 RUs that has 106 tones; 4 RUs that has 242 tones; 2 RUs that has 484 tones and 1 RU that is 996 tone. There are 68 RU candidates in total. Simplest way is to index the 68 RUs and use 8 bits to address the exact RU to one client. If MU-MIMO is used, the number of users paired in a RU can be indicated by 4 bits.

The benefit of indexing all the RU is that only 9 bits/client is required even for 320 MHz PPDU even including the non-contiguous RU defined in EHT. If reusing 11ax signaling, the common field itself has at least 8*8*2=128 bits.

Considering the implementation simplicity, the 9 bits/client can even be fixed regardless of the PPDU bandwidth.

Compressed modes:

Compression mode 1: full BW SU:

U-SIG indicates full BW SU or not. If full BW SU is scheduled in the PPDU, U-SIG does not need to indicate EHT-SIG LENGTH. U-SIG only needs to indicate the EHT-SIG MCS.

The RU allocation signaling can be included in the version dependent portion of U-SIG. The RU allocation can be puncturing information (indicate which subchannel is punctured and cannot be used). Or the RU allocation can be the allocated RU to a client (indicate which RU is used explicitly).

Figure 6:
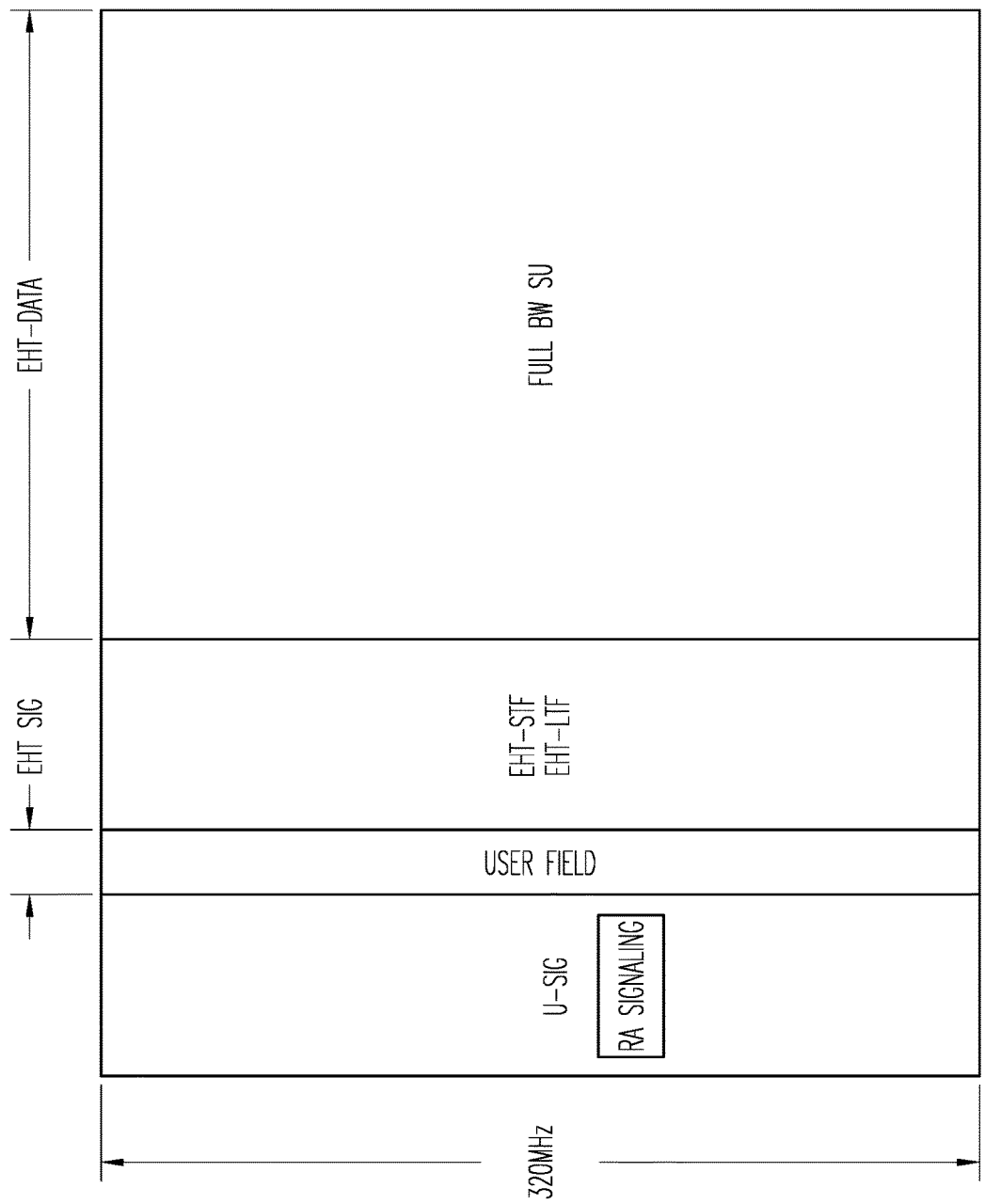
FIG. 6 illustrates an example of a full bandwidth single-user (SU) resource allocation (RA) structure in accordance with some embodiments.

Any other information required to decode the PPDU, e.g. MCS, number of spatial streams and channel coding information, can be carried in the user field of the EHT-SIG field. This structure is illustrated in FIG. 6

Compression mode 2: full BW MU-MIMO:

The full BW MU-MIMO can use similar signaling as flax. U-SIG will indicate full BW MU-MIMO mode. The EHT- SIG LENGTH field in the U-SIG will be repurposed to indicate the total number of users pared in the DL MU-MIMO. The spatial stream configuration in the user field can reuse the one defined in the MU-MIMO user field in 11ax.

Another approach is to jointly code the number of users paired in MU-MIMO and the spatial stream configuration. 11ax use the table below to indicate the spatial configuration give different number of users and use another 3 bits to indicate N user. Joint coding means a total number of 7 bits (as an example) can be used to indicate the client on which spatial stream the client is allocated. In the meanwhile, one client also knows how many other clients are paired in the RU.

Note that compression mode 1 and mode 2 may be combined. And mode 1 can be a special case of mode 2 with only one user presented.

Compression mode 3: large RU only:

The proposal is to indicate if the current PPDU only include larger RU (e.g. >=242 tone RU), or the current PPDU include both larger RU and small RU. The main motivation is to reduce the signaling overhead.

The use cases that a PPDU only includes large RU includes: 1) EHT is targeting for high throughput and wide bandwidth. AP may have more chance to allocate large RU to one or multiple clients. 2) If AP needs to allocate small RU to serve a large number of clients, AP may fall back to 11ax OFDMA.

If a PPDU only includes large RU, the RU allocation subfield may have less than 64 entries. Such that one RU allocation subfield requires 6 bits table instead of 8 bits table as in 11ax.

Another option is to define multiple thresholds of large RU size. E.g. AP can indicate a PPDU only includes 242 tone or larger RU; AP can indicate a PPDU only includes 484 tone or larger RU; AP can indicate a PPDU only includes 996 tone RU. These indications should be done before the EHT-SIG parsing. For instance, these indications can be included in the U-SIG.

The other way to reduce the signaling overhead is to indicate if a RU has MU-MIMO scheduling that MU-MIMO supports greater than 16 spatial streams. The indication can be done together with the RU size indication.

In some embodiments, the common SIG of the EHT PPDU is further encoded to include a BSS color field.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE draft specification IEEE P802.11ax/D4.0, February 2019 is incorporated herein by reference in its entirety. In some embodiments, the AP and STAs may be directional multi-gigabit (DMG) STAs or enhanced DMG (EDMG) STAs configured to communicate in accordance with IEEE 802.11ad standard or IEEE draft specification IEEE P802.11ay, February 2019, which is incorporated herein by reference.

Figure 4:
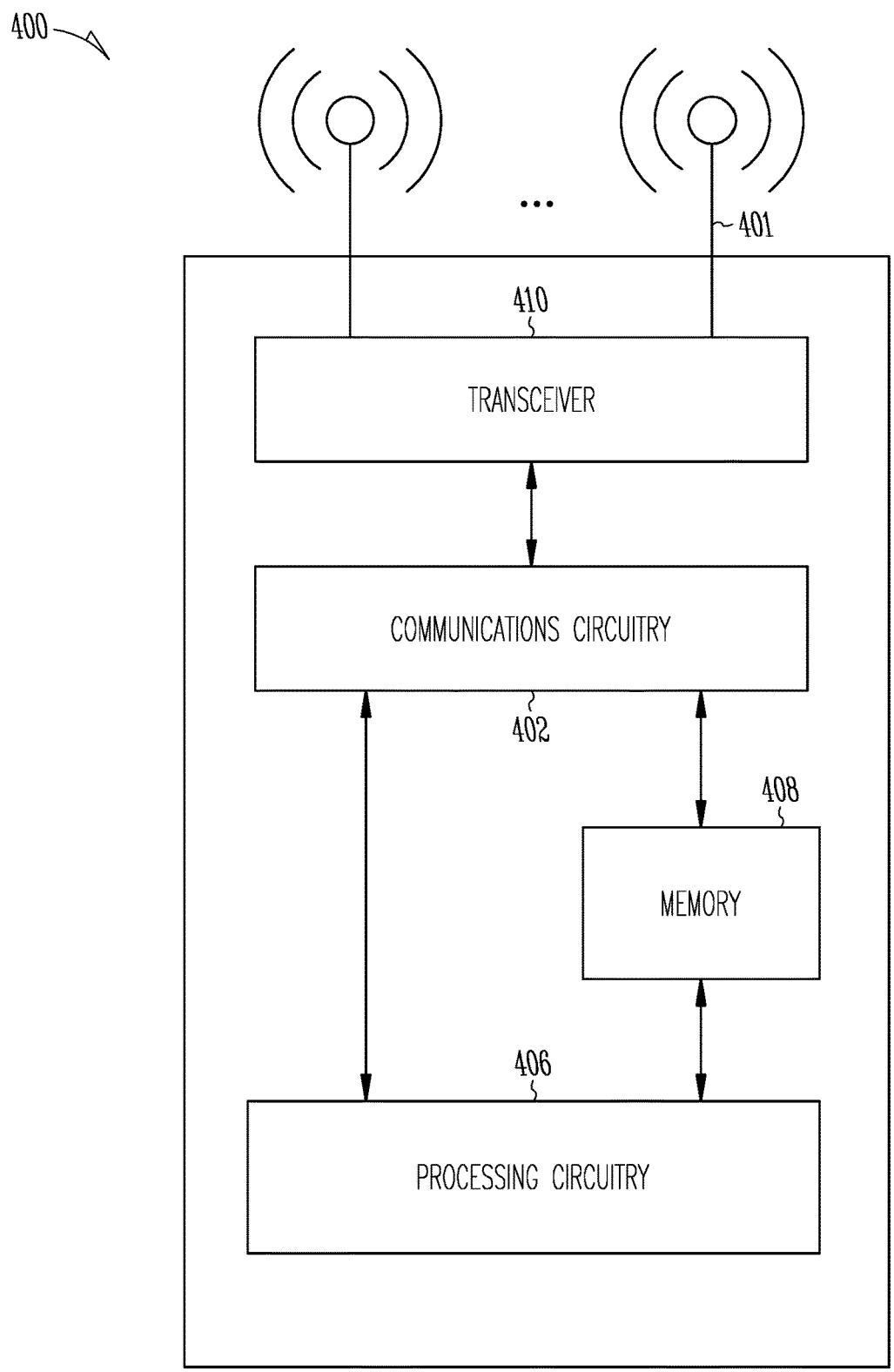
FIG. 4 illustrates a functional block diagram of an EHT STA in accordance with some embodiments.

FIG. 4 illustrates a functional block diagram of an EHT STA in accordance with some embodiments. In one embodiment, FIG. 4 illustrates a functional block diagram of a communication station that may be suitable for use as an access point (AP) or a user device (e.g., a STA) in accordance with some embodiments. The communication station 400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 400 may include communications circuitry 402 and a transceiver 410 for transmitting and receiving signals to and from other communication stations using one or more antennas 401. The communications circuitry 402 may include circuitry that can operate the physical layer (PHY) communications and/or medium access control (MAC) communications for controlling access to the wireless medium, and/or any other communications layers for transmitting and receiving signals. The communication station 400 may also include processing circuitry 406 and memory 408 arranged to perform the operations described herein. In some embodiments, the communications circuitry 402 and the processing circuitry 406 may be configured to perform operations detailed in the above figures, diagrams, and flows.

In accordance with some embodiments, the communications circuitry 402 may be arranged to contend for a wireless medium and configure frames or packets for communicating over the wireless medium. The communications circuitry 402 may be arranged to transmit and receive signals. The communications circuitry 402 may also include circuitry for modulation/demodulation, upconversion/downconversion, filtering, amplification, etc. In some embodiments, the processing circuitry 406 of the communication station 400 may include one or more processors. In other embodiments, two or more antennas 401 may be coupled to the communications circuitry 402 arranged for sending and receiving signals. The memory 408 may store information for configuring the processing circuitry 406 to perform operations for configuring and transmitting message frames and performing the various operations described herein. The memory 408 may include any type of memory, including non-transitory memory, for storing information in a form readable by a machine (e.g., a computer). For example, the memory 408 may include a computer-readable storage device, read-only memory (ROM), random-access memory (RAM), magnetic disk storage media, optical storage media, flash-memory devices and other storage devices and media.

In some embodiments, the communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 400 may include one or more antennas 401. The antennas 401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 400 may include one or more of a keyboard, a display, a non-volatile memory port, multiple antennas, a graphics processor, an application processor, speakers, and other mobile device elements. The display may be an LCD screen including a touch screen.

Although the communication station 400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 400 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for an extremely high throughput (EHT) access point (AP) (EHT AP), the apparatus comprising: processing circuitry; and memory, the processing circuitry configured to:
   encode an EHT multi-user (MU) physical layer protocol data unit (PPDU) (EHT MU PPDU) for transmission to multiple EHT stations (STAs), wherein a preamble portion of the EHT MU PPDU is encoded to include a universal SIGNAL field (U-SIG) followed by an EHT-SIG field, the EHT MU PPDU comprising one of:
   a 240 MHz EHT PPDU when the EHT MU PPDU is to occupy a channel bandwidth of 240 MHz;
   a 160 MHz EHT PPDU when the EHT MU PPDU is to occupy a channel bandwidth of 160 MHz; and
   a 320 MHz EHT PPDU when the EHT MU PPDU is to occupy a channel bandwidth of 320 MHz,
   wherein the EHT MU PPDU comprises a plurality of two or more 80 MHz portions including one primary 80 MHz portion and one or more secondary 80 MHz portions, wherein the preamble portion is separately encoded for each 80 MHz portion, wherein the EHT-SIG is encoded to indicate a receiver address (RA) and resource unit allocation, and
   wherein the U-SIG for the primary 80 MHz portion is encoded to indicate whether any one or more of the EHT STAs will need to decode the EHT-SIG transmitted on one of the secondary 80 MHz portions to obtain receive address (RA) information.

2. The apparatus of claim 1, wherein for the 80 MHz EHT PPDU, the processing circuitry is configured to encode information for a common field of the EHT-SIG within a single codeword (CW), and
   wherein for the 160 MHz EHT PPDU or the 320 MHz EHT PPDU, the processing circuitry is configured to encode the information for the common field of the EHT-SIG across two codewords.

3. The apparatus of claim 2, wherein the U-SIG field is encoded to include a compression mode field,
   wherein when the compression mode field indicates that the EHT MU PPDU is a MU multiple-input multiple output (MIMO) (MU-MIMO) transmission with puncturing, the processing circuitry is configured to encode the U-SIG to include a bitmap to indicate which of the 80 MHz PPDU portions is punctured.

4. The apparatus of claim 3, wherein the processing circuitry is configured to limit a maximum number of the multiple EHT STAs that can be multiplexed using the MU MIMO transmission to eight.

5. The apparatus of claim 4, wherein the processing circuitry is to further encode the EHT MU PPDU to include an EHT short-training field (EHT-STF) and one or more EHT long-training fields (EHT-LTF) following the EHT-SIG field and include an EHT data field to follow the EHT-LTF.

6. The apparatus of claim 5, wherein the processing circuitry is further configured to encode the U-SIG to indicate the channel bandwidth of the EHT MU PPDU.

7. The apparatus of claim 6, wherein the memory is configured to store the U-SIG.

8. The apparatus of claim 7, wherein the processing circuitry comprises a baseband processor.

9. A non-transitory computer-readable storage medium that stores instructions for execution by processing circuitry of an extremely high throughput (EHT) access point (AP) (EHT AP), the processing circuitry configured to:
   encode an EHT multi-user (MU) physical layer protocol data unit (PPDU) (EHT MU PPDU) for transmission to multiple EHT stations (STAs), wherein a preamble portion of the EHT MU PPDU is encoded to include a universal SIGNAL field (U-SIG) followed by an EHT-SIG field, the EHT MU PPDU comprising one of:
   a 240 MHz EHT PPDU when the EHT MU PPDU is to occupy a channel bandwidth of 240 MHz;
   a 160 MHz EHT PPDU when the EHT MU PPDU is to occupy a channel bandwidth of 160 MHz; and
   a 320 MHz EHT PPDU when the EHT MU PPDU is to occupy a channel bandwidth of 320 MHz,
   wherein the EHT MU PPDU comprises a plurality of two or more 80 MHz portions including one primary 80 MHz portion and one or more secondary 80 MHz portions, wherein the preamble portion is separately encoded for each 80 MHz portion, wherein the EHT-SIG is encoded to indicate a receiver address (RA) and resource unit allocation, and
   wherein the U-SIG for the primary 80 MHz portion is encoded to indicate whether any one or more of the EHT STAs will need to decode the EHT-SIG transmitted on one of the secondary 80 MHz portions to obtain receive address (RA) information.

10. The non-transitory computer-readable storage medium of claim 9, wherein for the 80 MHz EHT PPDU, the processing circuitry is configured to encode information for a common field of the EHT-SIG within a single codeword (CW), and
    wherein for the 160 MHz EHT PPDU or the 320 MHz EHT PPDU, the processing circuitry is configured to encode the information for the common field of the EHT-SIG across two codewords.

11. The non-transitory computer-readable storage medium of claim 10, wherein the U-SIG field is encoded to include a compression mode field,
    wherein when the compression mode field indicates that the EHT MU PPDU is a MU multiple-input multiple output (MIMO) (MU-MIMO) transmission with puncturing, the processing circuitry is configured to encode the U-SIG to include a bitmap to indicate which of the 80 MHz PPDU portions is punctured.

12. The non-transitory computer-readable storage medium of claim 11, wherein the processing circuitry is configured to limit a maximum number of the multiple EHT STAs that can be multiplexed using the MU MIMO transmission to eight.

13. The non-transitory computer-readable storage medium of claim 12, wherein the processing circuitry is to further encode the EHT MU PPDU to include an EHT short-training field (EHT-STF) and one or more EHT long-training fields (EHT-LTF) following the EHT-SIG field and include an EHT data field to follow the EHT-LTF.

14. The non-transitory computer-readable storage medium of claim 13, wherein the processing circuitry is further configured to encode the U-SIG to indicate the channel bandwidth of the EHT MU PPDU.

15. An apparatus for an extremely high throughput (EHT) station (STA) (EHT STA), the apparatus comprising:
processing circuitry; and memory, the processing circuitry configured to:
decode an EHT multi-user (MU) physical layer protocol data unit (PPDU) (EHT MU PPDU) from an EHT access point (EHT AP) transmitted to multiple EHT STAs, wherein a preamble portion of the EHT MU PPDU includes a universal SIGNAL field (U-SIG) followed by an EHT-SIG field,
wherein the EHT MU PPDU comprises one of:
a 240 MHz EHT PPDU when the EHT MU PPDU occupies a channel bandwidth of 240 MHz;
a 160 MHz EHT PPDU when the EHT MU PPDU occupies a channel bandwidth of 160 MHz; and
a 320 MHz EHT PPDU when the EHT MU PPDU occupies a channel bandwidth of 320 MHz,
wherein the EHT MU PPDU comprises a plurality of two or more 80 MHz portions including one primary 80 MHz portion and one or more secondary 80 MHz portions, wherein the preamble portion is separately encoded for each 80 MHz portion, wherein the EHT-SIG is encoded to indicate a receiver address (RA) and resource unit allocation, and
wherein the U-SIG for the primary 80 MHz portion is encoded to indicate whether any one or more of the multiple EHT STAs will need to decode the EHT-SIG transmitted on one of the secondary 80 MHz portions to obtain receive address (RA) information.

16. The apparatus of claim 15, wherein for the 80 MHz EHT PPDU, the processing circuitry is configured to decode information from a common field of the EHT-SIG within a single codeword (CW), and
wherein for the 160 MHz EHT PPDU or the 320 MHz EHT PPDU, the processing circuitry is configured to decode the information of the common field of the EHT-SIG across two codewords.

17. The apparatus of claim 16, wherein the U-SIG field includes a compression mode field,
wherein when the compression mode field indicates that the EHT MU PPDU is a MU multiple-input multiple output (MIMO) (MU-MIMO) transmission with puncturing, the U-SIG includes a bitmap to indicate which of the 80 MHz PPDU portions is punctured.

18. The apparatus of claim 17, wherein a maximum number of the multiple EHT STAs that can be multiplexed using the MU MIMO transmission is eight.

19. The apparatus of claim 18, wherein the processing circuitry is to further decode fields of the EHT MU PPDU including an EHT short-training field (EHT-STF) and one or more EHT long-training fields (EHT-LTF) following the EHT-SIG field, and an EHT data field following the EHT-LTF.

20. The apparatus of claim 19, wherein the processing circuitry is further configured to decode the U-SIG to determine the channel bandwidth of the EHT MU PPDU.

* * * * *